(12) United States Patent
Qiu et al.

(10) Patent No.: US 11,353,950 B2
(45) Date of Patent: Jun. 7, 2022

(54) INFORMATION INTERACTION METHOD AND DEVICE, STORAGE MEDIUM AND ELECTRONIC DEVICE

(71) Applicant: Tencent Technology (Shenzhen) Company Limited, Shenzhen (CN)

(72) Inventors: Meng Qiu, Shenzhen (CN); Jiaqi Pan, Shenzhen (CN); Ya Zhang, Shenzhen (CN); Shuting Zhang, Shenzhen (CN); Qinghua Xiao, Shenzhen (CN); Junming Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 122 days.

(21) Appl. No.: 16/884,877

(22) Filed: May 27, 2020

(65) Prior Publication Data
US 2020/0285306 A1    Sep. 10, 2020

Related U.S. Application Data

(63) Continuation of application No. PCT/CN2018/119356, filed on Dec. 5, 2018.

(30) Foreign Application Priority Data

Feb. 11, 2018   (CN) .................... 201810142618.X

(51) Int. Cl.
*G06F 3/01*     (2006.01)
*G10L 25/66*    (2013.01)
*G06V 40/16*    (2022.01)

(52) U.S. Cl.
CPC ............ *G06F 3/011* (2013.01); *G06V 40/168* (2022.01); *G06V 40/174* (2022.01); *G10L 25/66* (2013.01)

(58) Field of Classification Search
CPC .......... G06F 3/011; G06F 3/013; G06F 3/014; G06K 9/00268; G06K 9/00288;
(Continued)

(56) References Cited

U.S. PATENT DOCUMENTS

| 2010/0035686 A1 | 2/2010 | Nakashima |
| 2017/0177295 A1 | 6/2017 | Bowen |
| 2018/0165863 A1* | 6/2018 | Kubo ..................... A63F 13/213 |

FOREIGN PATENT DOCUMENTS

| CN | 103207662 A | 7/2013 |
| CN | 103258556 A | 8/2013 |

(Continued)

OTHER PUBLICATIONS

Tencent Technology, ISR, PCT/CN2018/119356, Mar. 12, 2019, 2 pgs.

(Continued)

*Primary Examiner* — Robert J Michaud
(74) *Attorney, Agent, or Firm* — Morgan, Lewis & Bockius LLP

(57) ABSTRACT

This application discloses an information exchange method performed at a terminal. The method includes: extracting, by the terminal, a biological feature of a target object, the target object controlling, by using a first client running at the terminal, a first virtual object to execute a virtual task; recognizing, by the terminal, a current first emotion of the target object according to the extracted biological feature; determining, by the terminal, to-be-exchanged first interaction information matching the first emotion; and transmitting, by the terminal, the first interaction information to a second client running at a second terminal at which a second virtual object is located and controlled by a second target. The second target controls the second virtual object according to the first interaction information to execute the virtual task jointly with the first virtual object. This application (Continued)

resolves the technical problem of high complexity of exchanging operation in information exchange methods.

20 Claims, 9 Drawing Sheets

(58) Field of Classification Search
CPC .......... G06K 9/00302; G06K 9/00342; G10L 25/66; G10L 25/78
See application file for complete search history.

(56) References Cited

FOREIGN PATENT DOCUMENTS

| | | | |
|---|---|---|---|
| CN | 104035558 | A | 9/2014 |
| CN | 104866101 | A | 8/2015 |
| CN | 108681390 | A | 10/2018 |
| JP | 6263252 | B1 | 1/2018 |

OTHER PUBLICATIONS

Tencent Technology, WO, PCT/CN2018/119356, Mar. 12, 2019, 4 pgs.
Tencent Technology, IPRP, PCT/CN2018/119356, Aug. 11, 2020, 5 pgs.
Extended European Search Report, 18905825,8, dated Oct. 15, 2021, 12 pgs.

* cited by examiner

INFORMATION INTERACTION METHOD AND DEVICE, STORAGE MEDIUM AND ELECTRONIC DEVICE

CROSS REFERENCE TO RELATED APPLICATIONS

This application is a continuation application of PCT Application No. PCT/CN2018/119356, entitled "INFORMATION EXCHANGE METHOD, DEVICE, STORAGE MEDIUM, AND ELECTRONIC DEVICE" filed on Dec. 5, 2018, which claims priority to Chinese Patent Application No. 201810142618.X, entitled "INFORMATION EXCHANGE METHOD AND DEVICE, STORAGE MEDIUM, AND ELECTRONIC DEVICE" filed with the Chinese National Intellectual Property Administration on Feb. 11, 2018, all of which are incorporated by reference in their entirety.

FIELD OF THE TECHNOLOGY

This application relates to the field of computers, and specifically, to an information exchange method and device, a storage medium, and an electronic device.

BACKGROUND OF THE DISCLOSURE

To implement real-time information exchange in an application client run by a terminal, an input plug-in is generally disposed in an operation interface displayed by the application client. Information inputted by a user is obtained by using the input plug-in, and then the information is transmitted to a target object with which the information needs to be exchanged, to complete information exchange.

However, currently, many terminal applications need to be operated by both hands of a user, to complete a preset application task. That is, when the information exchange method provided in the related art is used, an application task executed by a control object controlled by the application client usually needs to be first interrupted, and after information exchange with the target object is completed by using the activated input plug-in, the application task executed by the control object is then restored. In other words, a problem of relatively high complexity of an exchange operation exists in the process of information exchange with the target object.

For the foregoing problem, currently no effective solutions have been put forward.

SUMMARY

Embodiments of this application provide an information exchange method and device, a storage medium, and an electronic device, so as to at least resolve the technical problem of relatively high complexity of an exchange operation in related information exchange methods.

According to an aspect of the embodiments of this application, an information exchange method is performed at a terminal having one or more processors and memory storing programs to be executed by the one or more processors. The method includes: extracting, by the terminal, a biological feature of a target object, the target object controlling, by using a first client running at the terminal, a first virtual object to execute a virtual task; recognizing, by the terminal, a current first emotion of the target object according to the extracted biological feature; determining, by the terminal, to-be-exchanged first interaction information matching the first emotion; and transmitting, by the terminal, the first interaction information to a second client running at a second terminal at which a second virtual object is located and controlled by a second target, wherein the second target controls the second virtual object in accordance with the first interaction information to jointly execute the virtual task with the first virtual object.

According to another aspect of the embodiments of this application, an information exchange device is further provided. The device is applied to a terminal, and includes: an extraction unit, configured to extract a biological feature of a target object, the target object controlling, by using a first client, a first virtual object to execute a virtual task; a recognition unit, configured to recognize a current first emotion of the target object according to the extracted biological feature; a determining unit, configured to determine to-be-exchanged first interaction information matching the first emotion; and a transmission unit, configured to transmit the first interaction information to a second client at which a second virtual object is located, the second virtual object and the first virtual object jointly executing the virtual task.

According to still another aspect of the embodiments of this application, a non-transitory computer-readable storage medium is further provided. The storage medium stores a computer program, the computer program being configured to perform the foregoing information exchange method when executed.

In the embodiments of this application, by using the method in which a terminal extracts a biological feature of a target object, recognizes a current first emotion of the target object according to the extracted biological feature, determines to-be-exchanged first interaction information matching the first emotion, and transmits the first interaction information to a second client at which a second virtual object is located, the terminal can obtain the to-be-exchanged first interaction information according to the biological feature of the target object, and transmit the first interaction information to the second client, thereby avoiding the problem that information exchange with the target object can only be completed when an application task executed by a control object controlled by an application client is interrupted. Therefore, information exchange can be completed during a process in which the control object executes an application character, thereby implementing the technical effect of reducing complexity of an exchange operation, and further resolving the technical problem of relatively high complexity of an exchange operation in related information exchange methods.

BRIEF DESCRIPTION OF THE DRAWINGS

The accompanying drawings described herein are used for providing further understanding of this application, and constitute a part of this application. Exemplary embodiments of this application and descriptions thereof are used for explaining this application, and do not constitute any improper limitation to this application. Among the accompanying drawings.

DESCRIPTION OF EMBODIMENTS

To make solutions of this application more comprehensible for a person skilled in the art, the following clearly and completely describes the technical solutions in embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

The terms such as "first" and "second" in the specification, claims of this application, and the foregoing accompanying drawings of this application that are intended to distinguish between similar objects rather than describe a particular sequence or a chronological order. It is to be understood that the data termed in such a way are interchangeable in proper circumstances so that the embodiments of this application described herein can be implemented in orders except the order illustrated or described herein. In addition, the terms "include", "comprise" and any other variants thereof are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

According to an aspect of the embodiments of this application, an information exchange method is provided. Optionally, the information exchange method may be applied to, but not limited to, an environment shown in FIG. 1.

Figure 1:
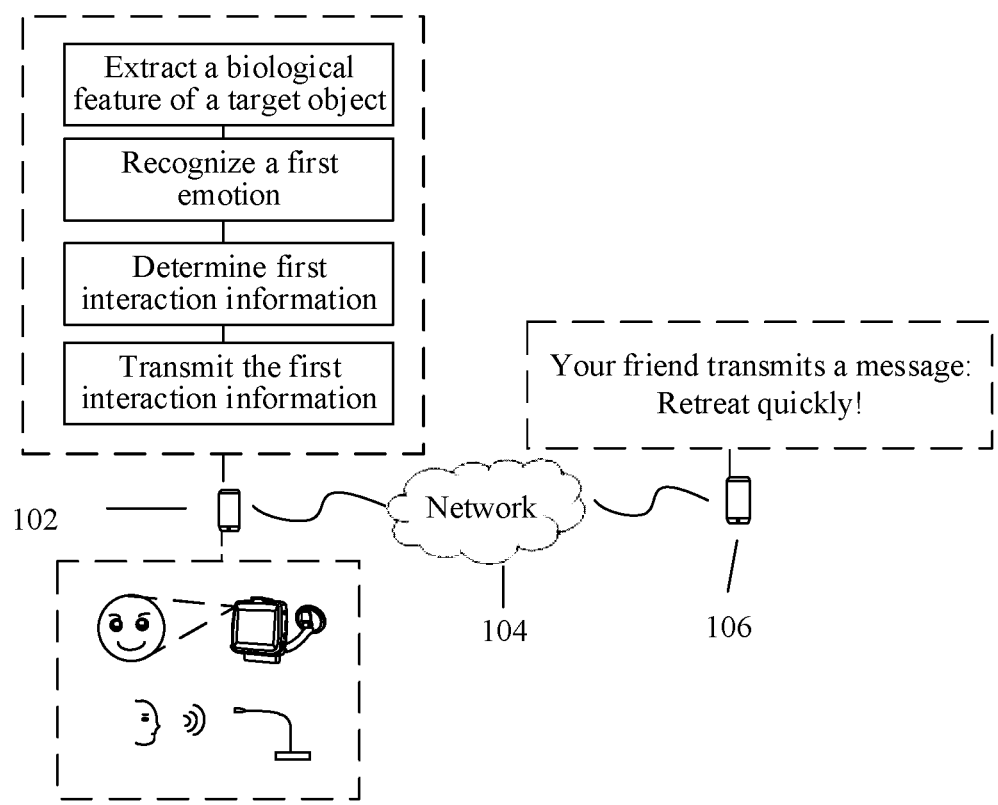
FIG. 1 is a schematic diagram of an application environment of an optional information exchange method according to an embodiment of this application.

As shown in FIG. 1, a terminal 102 recognizes facial features of a person by using a recognition device that is carried by the terminal and used for recognizing a biological feature of a user, or acquires a sound feature of a user by using a sound acquisition device. A first emotion of a target object is recognized according to the acquired biological feature, to-be-exchanged first interaction information matching the first emotion is determined, and the first interaction information is transmitted, through a network 104, to a second terminal 106 at which a second virtual object is located. After receiving the first interaction information, the second terminal 106 displays the first interaction information on a second client. A first client is located at the first terminal 102, and the second client is located at the second terminal 106.

Optionally, in this embodiment, the first client and the second client may include, but limited to at least one of the following: a mobile phone, a tablet computer, a notebook computer, and another mobile hardware device capable of extracting a biological feature of the target object. The network may include, but not limited to a wireless network, the wireless network including: Bluetooth, WIFI, and another network implementing wireless communication. The foregoing description is merely an example, and no limitation is imposed in this embodiment.

Figure 2:
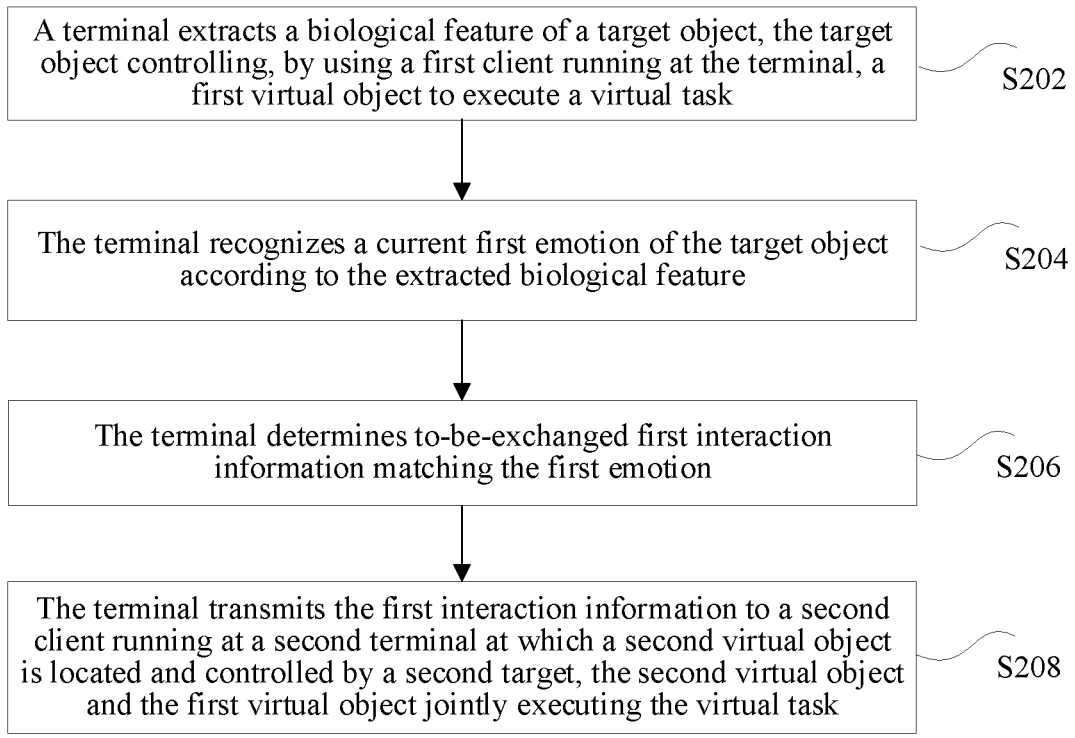
FIG. 2 is a schematic flowchart of an optional information exchange method according to an embodiment of this application.

Optionally, in this embodiment, in an optional implementation, as shown in FIG. 2, the information exchange method may include:

S202. A terminal extracts a biological feature of a target object, the target object controlling, by using a first client running at the terminal, a first virtual object to execute a virtual task.

S204. The terminal recognizes a current first emotion of the target object according to the extracted biological feature.

S206. The terminal determines to-be-exchanged first interaction information matching the first emotion.

S208. The terminal transmits the first interaction information to a second client running at a second terminal at which a second virtual object is located and controlled by a second target, e.g., a teammate of the first target. The second target then controls the second virtual object in accordance with the first interaction information to execute the virtual task jointly with the first virtual object.

Optionally, the information exchange method may be applied to, but not limited to, a game field or a simulation training field. The game field is used as an example. The first client may be a terminal used by a user, and the second client may be a terminal used by another user. The first virtual object may be a virtual object controlled by the first client, and the second virtual object may be a virtual object controlled by the second client. After a terminal used by a user extracts a biological feature of the user, the terminal recognizes a current first emotion, such as anger, tension, or excitement of the user according to the extracted biological feature. After recognizing the current first emotion, the terminal determines first interaction information matching the current first emotion, and transmits the first interaction information to a second client used by another user.

In the foregoing method, a terminal extracts a biological feature of a target object, recognizes a current first emotion of the target object according to the extracted biological feature, determines to-be-exchanged first interaction information matching the first emotion, and transmits the first interaction information to a second client at which a second virtual object is located, so that the to-be-exchanged first interaction information can be obtained according to the biological feature of the target object, and the first interaction information can be transmitted to the second client, thereby avoiding the problem that information exchange with the target object can only be completed when an application task executed by a control object controlled by an application client is interrupted. Therefore, information exchange can be completed during a process in which the control object executes an application character, thereby implementing the technical effect of reducing complexity of an exchange operation, and resolving the problem of high complexity of an exchange operation in the related art.

Optionally, a facial picture of the target object may be acquired by using an image acquisition device of a terminal at which the first client is located, and facial features of the target object are extracted from the facial picture. The terminal searches for an emotion identifier corresponding to the facial features according to the extracted facial features, and uses an emotion represented by the emotion identifier as the first emotion.

Figure 3:
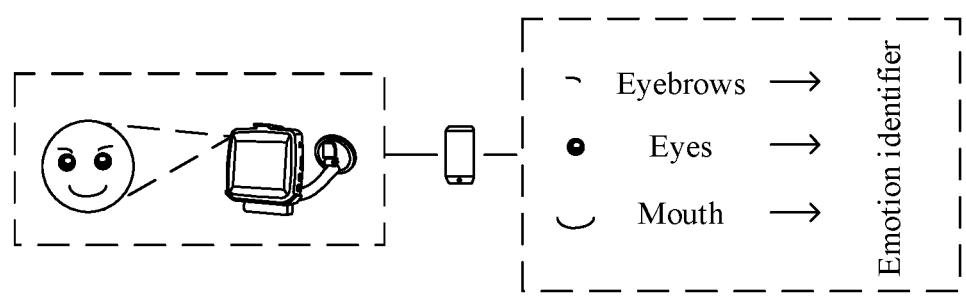
FIG. 3 is a schematic diagram of an optional information exchange method according to an embodiment of this application.

For example, descriptions are provided with reference to FIG. 3. The biological feature may be a facial expression or sound information of the user. As shown in FIG. 3, a facial picture of the user is acquired by using an acquisition device, the acquired facial picture is analyzed, and facial features, such as eyebrows, eyes, and mouth of the user are extracted. The first emotion of the user is correspondingly obtained according to characteristics of the facial features.

Optionally, a sound signal of the target object may be acquired by using a sound acquisition device of the terminal at which the first client is located, and a sound feature of the target object is extracted from the sound signal. The terminal compares the extracted sound feature with a preconfigured target audio feature. In a case that a similarity between the sound feature and the target audio feature is higher than a predetermined threshold, the terminal obtains an emotion identifier corresponding to the target audio feature, and uses an emotion represented by the emotion identifier as the first emotion.

Figure 4:
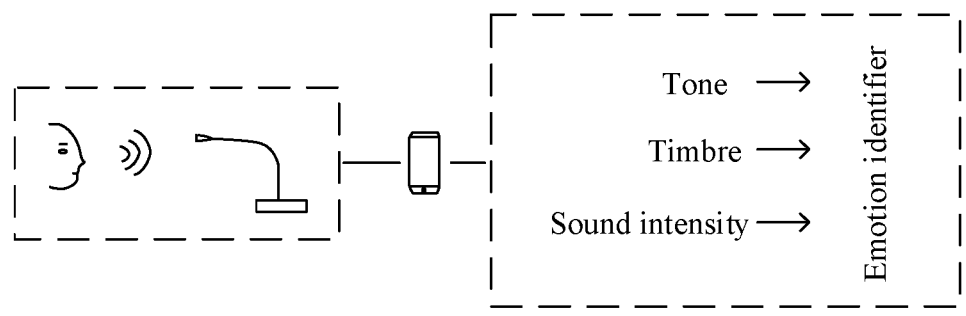
FIG. 4 is a schematic diagram of another optional information exchange method according to an embodiment of this application.

For example, descriptions are provided with reference to Table 1 and FIG. 4. The sound signal may be a sound made by a user. As shown in FIG. 4, after the user makes the sound, the sound acquisition device acquires the sound of the user, and compares the acquired sound with the target audio feature, to obtain the emotion identifier corresponding to the target audio feature, and obtains the first emotion. As shown in Table 1, after information of a sound signal that is of the target object and acquired by the sound acquisition device, for example, "Brothers, go!" is received, a sound feature "go" in the received sound signal is compared with the target audio feature, to obtain that a similarity between the sound feature and the target audio feature is 80%. The similarity exceeds a predetermined threshold 60%, and a corresponding emotion identifier is obtained according to the target audio feature. The emotion identifier is excitement, representing that the user currently is in great excitement.

TABLE 1

| Sound signal | Sound feature | Similarity with a target audio feature | Emotion identifier |
| --- | --- | --- | --- |
| Brothers, go! | Go | 80% | Excitement |
| Brothers, retreat! | Retreat | 90% | Fear |
| Hold on! | Hold on | 80% | Tension |
| Turn left | Left | 10% | No corresponding emotion identifier |

The content in Table 1 is merely for explanation and description, and does not constitute a limitation on this application. The target audio feature may be any sound signal acquired by the sound acquisition device. The sound feature may be acquired by using any algorithm. The target audio feature may be obtained by using a preset method. The emotion identifier may be another word.

The target audio feature may also be a feature such as timbre, tone, sound intensity, or the like of a sound. After sound information of the user is obtained, the obtained sound information is compared with the timbre, tone, and sound intensity in the target audio feature, so as to obtain the corresponding emotion identifier.

Figure 5:
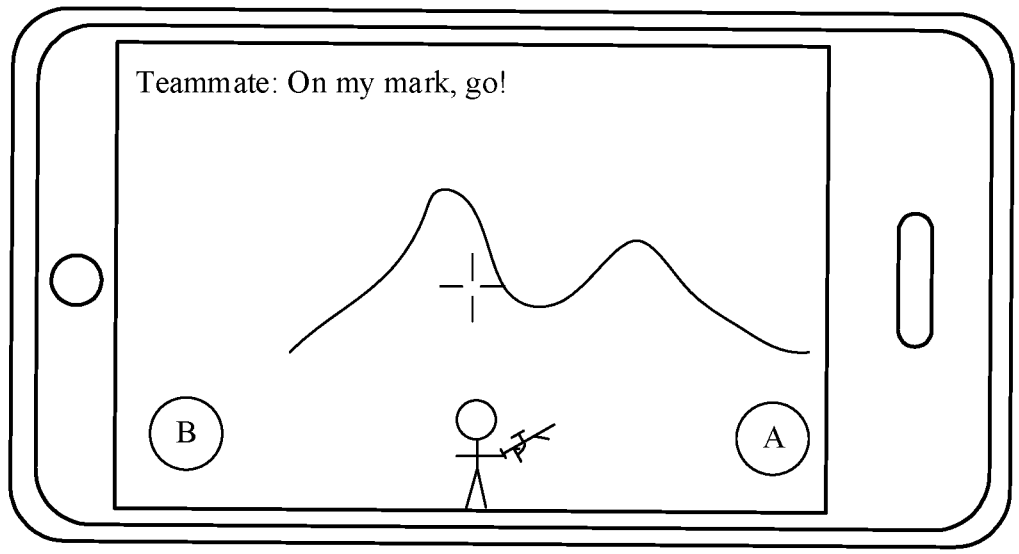
FIG. 5 is a schematic diagram of still another optional information exchange method according to an embodiment of this application.
Figure 6:
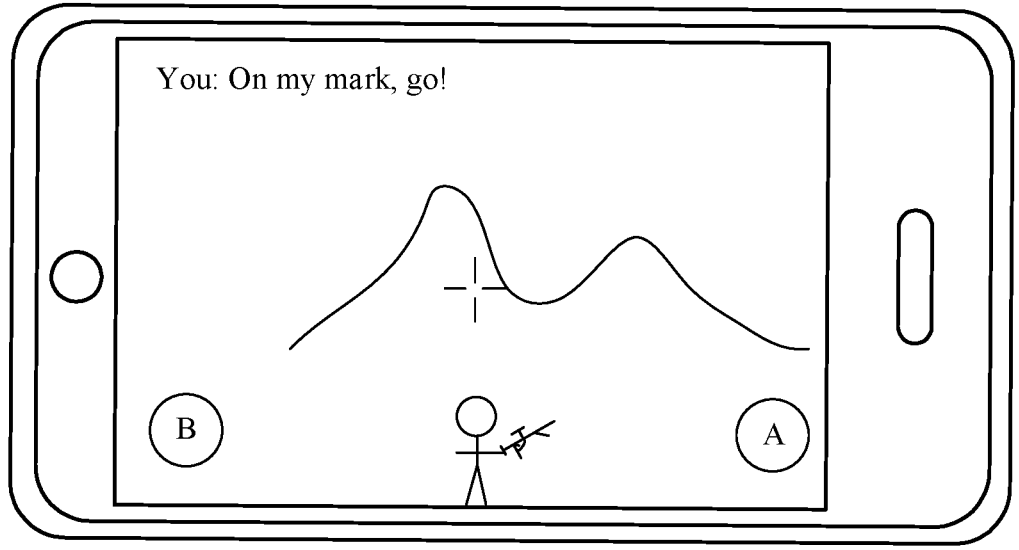
FIG. 6 is a schematic diagram of still another optional information exchange method according to an embodiment of this application.

Descriptions are provided below using games are as an example with reference to FIG. 5 and FIG. 6. In a round of game, a terminal at which a first client is located acquires a facial picture and sound information of a user by using an acquisition device carried by the terminal. The terminal analyzes the acquired facial picture to obtain facial features, and analyzes the sound information to obtain a sound feature. A corresponding emotion identifier is obtained according to the facial features and the sound feature, so as to obtain a first emotion of the user. Subsequently, first interaction information is correspondingly obtained according to the obtained first emotion, and is displayed on a second client. A display result is shown in FIG. 5.

When the second client displays the first interaction information, the first interaction information may be or may not be displayed on the first client. FIG. 6 is an example in which the first client displays the first interaction information.

Optionally, the terminal may, but not limited to, determining a virtual object from the same camp as the first virtual object as a second virtual object, and determining a virtual objects from a camp different from the camp that the first virtual object is from as a third virtual object.

Optionally, the second virtual object may be one or more virtual objects belonging to the same camp as the first virtual object, and the third virtual object may be one or more virtual objects belonging to camps different from the camp to which the first virtual object belongs. The second virtual object and the first virtual object may be teammates. The third virtual object and the first virtual object may be in different squads, and the like.

Optionally, the following method may be used for determining the second virtual object or the third virtual object:

(1) grouping, by the terminal, virtual objects into the second virtual object or the third virtual object according to identity information of the virtual objects;

(2) grouping, by the terminal, virtual objects into the second virtual object or the third virtual object according to task objectives of the virtual objects; or (3) grouping, by the terminal, virtual objects into the second virtual object or the third virtual object according to locations of the virtual objects.

For example, the game field continues to be used as an example for description. The identity information may be genders, nationalities, and the like of the virtual objects. For example, the terminal sets a virtual object having the same nationality as that of the first virtual object as the second virtual object, and sets a virtual object having a nationality different from that of the first virtual object as the third virtual object. The locations may be birth locations of the virtual objects. For example, the birth locations are used as an example. Different birth regions of virtual objects are preset, a virtual object having the same birth region as that of the first virtual object is set as the second virtual object, and a virtual object having a birth region different from that of the first virtual object is set as the third virtual object. The task objectives of the virtual objects may be winning conditions for the virtual objects. A virtual object having the same winning condition as that of the first virtual object is grouped into the second virtual object, and a virtual object having a winning condition different from that of the first virtual object is grouped into the third virtual object.

Optionally, the terminal may use all virtual objects belonging to the same camp as the first virtual object as the second virtual object, and transmits the first interaction information to the second client at which the second virtual object is located, or use some virtual objects belonging to the same camp as the first virtual object as the second virtual object, and transmits the second virtual object to the second client at which the second virtual object is located; and transmits second interaction information to a third client at which the third virtual object is located, the third client belonging to a camp different from the camp to which the first virtual object belongs. The first interaction information matches the first emotion, the second interaction information matches a second emotion, and the first emotion is different from the second emotion.

Figure 7:
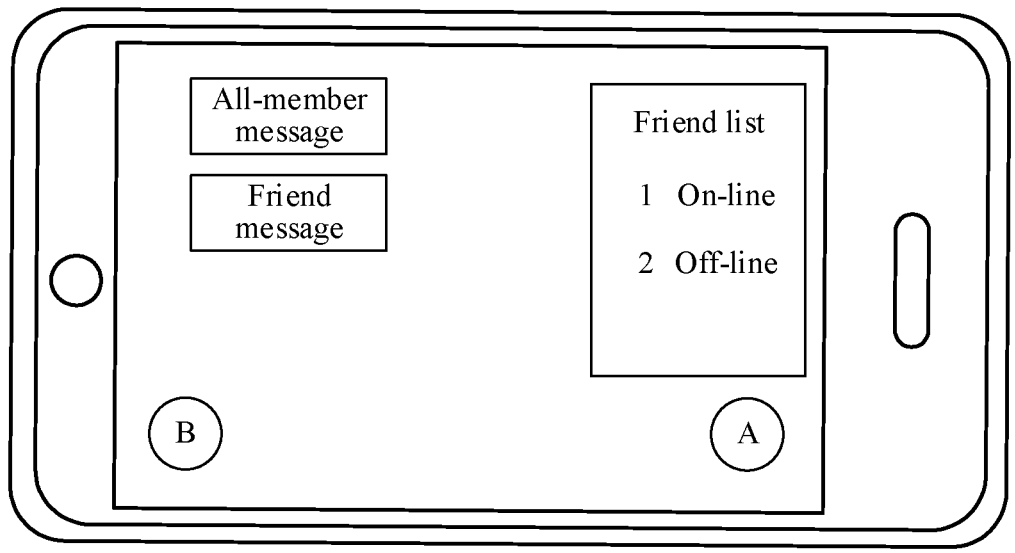
FIG. 7 is a schematic diagram of still another optional information exchange method according to an embodiment of this application.

For example, descriptions are provided by still using the foregoing game as an example with reference to FIG. 7. As shown in FIG. 7, a transmission range of the first interaction information may be configured on the first client, and the first interaction information may be an all-member message or a friend message. The first client may transmit an all-member message, and may also transmit a friend message to a configured fixed friend. Transmitting the all-member message may be transmitting a message to all other users, and transmitting the friend message may be that: a plurality of friends form a small group, and during transmission of a friend message, the friend message is transmitted to friends in one small group all at once, or the friend message is transmitted to a fixed friend.

Figure 8:
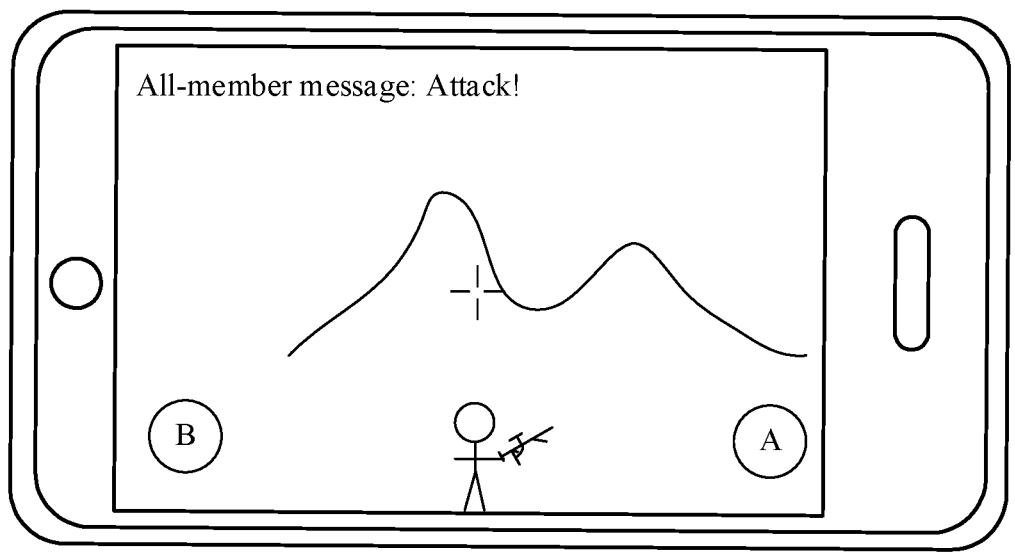
FIG. 8 is a schematic diagram of still another optional information exchange method according to an embodiment of this application.
Figure 9:
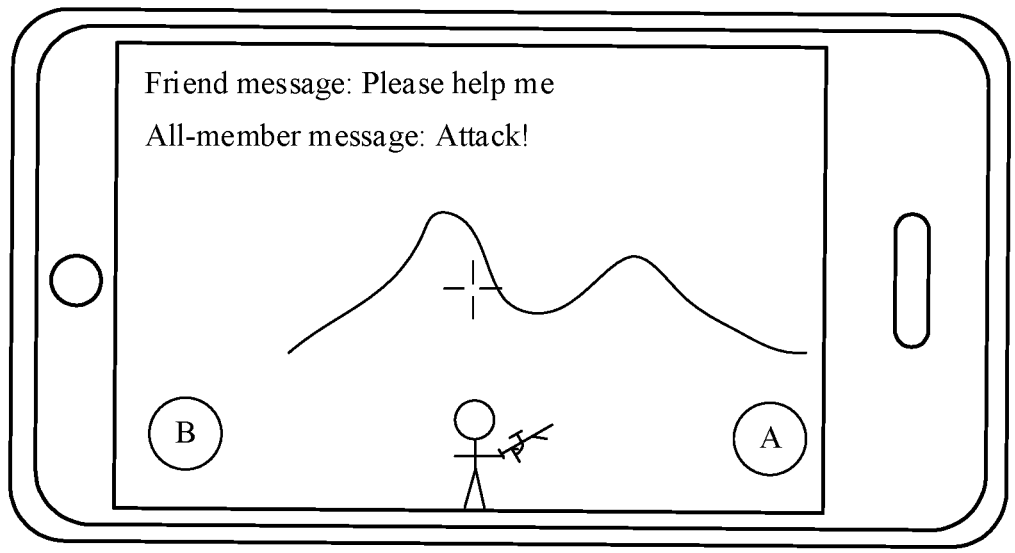
FIG. 9 is a schematic diagram of still another optional information exchange method according to an embodiment of this application.
Figure 10:
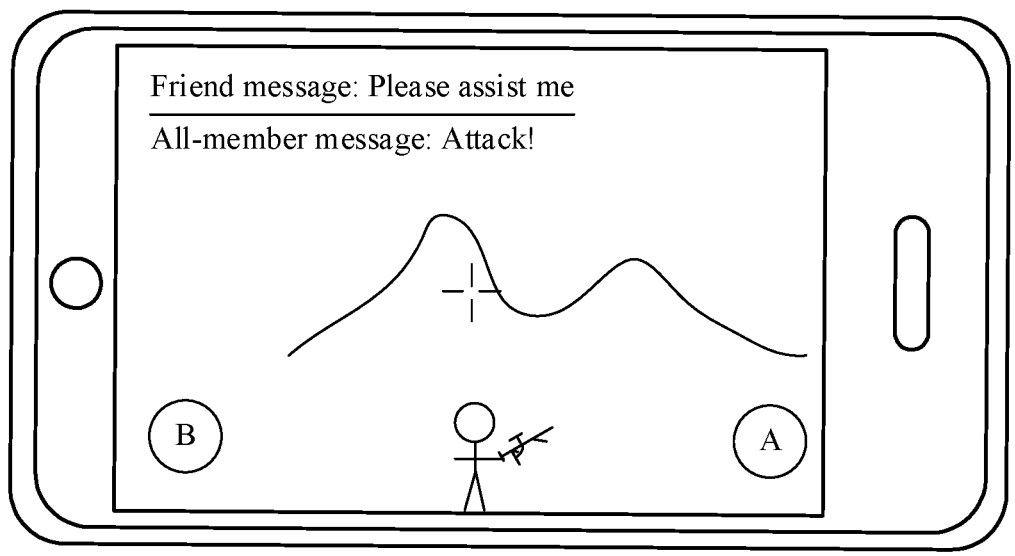
FIG. 10 is a schematic diagram of still another optional information exchange method according to an embodiment of this application.

For example, as shown in FIG. 8 to FIG. 10, FIG. 8 depicts that when the first client is configured to transmit an all-member message, the second client displays the all-member message transmitted by the first client, the all-member message being a message that can be seen by all the users. FIG. 9 depicts that when the user transmits a friend message, the friend message transmitted by the user can be seen from the second client, but the friend message cannot be seen by all the users. Only friends configured by the first client can see the friend message. An all-member message and a friend message may be distinguished by setting the all-member message and the friend message to different colors or to have different signs. As shown in FIG. 10, a friend message in FIG. 10 has an underline, and therefore is separated from the all-member message.

Figure 11:
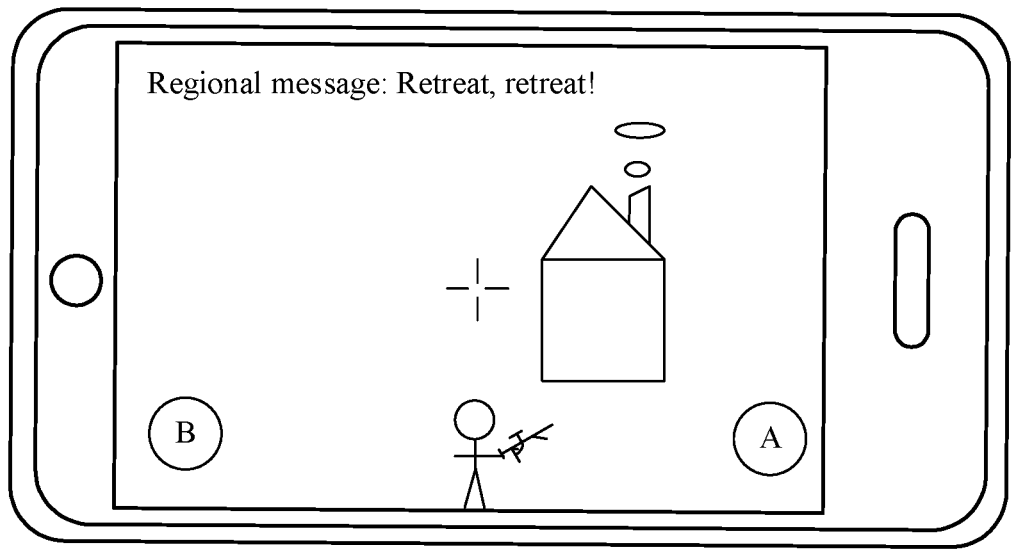
FIG. 11 is a schematic diagram of still another optional information exchange method according to an embodiment of this application.

Optionally, after the first client transmits a message, the third client at which the third virtual object is located receives a message different from that received by the second client. For example, as shown in FIG. 5 and FIG. 11, FIG. 5 is the first interaction information received by the second client, and FIG. 11 is the first interaction information received by the third client. It can be seen that because the third virtual object of the third client and the first virtual object of the first client are from different camps, a message displayed by the third client is different from a message displayed by the second client.

Optionally, that the terminal searches for the first interaction information matching the emotion identifier of the first emotion includes: obtaining, by the terminal, in a case that the emotion identifier indicates a first emotion type, first interaction information matching the first emotion type, the first interaction information matching the first emotion type being used for asking for help for the first virtual object; obtaining, by the terminal, in a case that the emotion identifier indicates a second emotion type, first interaction information matching the second emotion type, the first interaction information matching the second emotion type being used for performing an encouraging prompt on the second virtual object; and obtaining, by the terminal, in a case that the emotion identifier indicates a third emotion type, first interaction information matching the third emotion type, the first interaction information matching the third emotion type being used for making a query request to the second virtual object.

In this embodiment, by using a method in which a terminal extracts a biological feature of a target object, recognizes a current first emotion of the target object according to the extracted biological feature, determines to-be-exchanged first interaction information matching the first emotion, and transmits the first interaction information to a second client at which a second virtual object is located, the to-be-exchanged first interaction information can be obtained according to the biological feature of the target object, and the first interaction information can be transmitted to the second client, thereby avoiding the problem that information exchange with the target object can only be completed when an application task executed by a control object controlled by an application client is interrupted. Therefore, the technical effect of reducing complexity of an exchange operation is implemented, and the technical problem of high complexity of an exchange operation in the related art is resolved.

In an optional implementation, that the terminal transmits the first interaction information to a second client at which a second virtual object is located includes:

S1: determining, by the terminal, the second virtual object from the virtual task, the second virtual object and the first virtual object being virtual objects from the same camp; and S2: transmitting, by the terminal, the first interaction information to the second client at which the second virtual object is located.

Optionally, the first interaction information may be text information, image information, or audio information. Descriptions are provided by using text information as the first interaction information with reference to FIG. 5. A client displayed in FIG. 5 is the second client, and a virtual object in the second client is the second virtual object. The first virtual object on the first client and the second virtual object are teammates, and an upper left corner of the second client displays a message transmitted by the first client. The second client can learn a state of the first virtual object of the first client.

In this embodiment, the terminal determines a virtual object from the same camp as a first virtual object as a second virtual object, and transmits first interaction information to a second client at which the second virtual object is located, so as to transmit the first interaction information only to the second virtual object in the same camp, thereby improving transmission flexibility of the first interaction information.

In an optional implementation, that the terminal determines the second virtual objects from the virtual task includes:

(1) obtaining, by the terminal, all of virtual objects from the same camp as the second virtual objects; or (2) obtaining, by the terminal, some of virtual objects from the same camp as the second virtual objects, the some virtual objects having an association with the first virtual object.

For example, the game field continues to be used for explanation and description. As shown in FIG. 7, FIG. 7 is a configuration interface of the first client. The first client may transmit an all-member message, and may also transmit a friend message to a configured fixed friend. Transmitting the all-member message may be transmitting a message to all other users, and transmitting the friend message may be that: a plurality of friends form a small group, and during transmission of a friend message, the friend message is transmitted to friends in one small group all at once, or the friend message is transmitted to a fixed friend.

In this embodiment, the terminal uses all of virtual roles belonging to the same camp as a first virtual role as second virtual roles, or uses some of virtual roles belonging to the same camp as the first virtual role as second virtual roles, so that the second virtual roles can be flexibly determined, thereby enabling information exchange to be more flexible.

In an optional implementation, during that the terminal transmits the first interaction information to a second client at which a second virtual object is located, the method further includes:

S1: determining, by the terminal, a third virtual object from the virtual task, the third virtual object and the first virtual object being virtual objects from different camps; and S2: transmitting, by the terminal, second interaction information to a third client at which the third virtual object is located, the second interaction information matching a second emotion, and the second emotion and the first emotion being different emotions.

For example, as shown in FIG. 5 and FIG. 11, FIG. 5 is the first interaction information received by the second client, and FIG. 11 is the first interaction information received by the third client. It can be seen that because the third virtual object of the third client and the first virtual object of the first client are from different camps, a message displayed by the third client is different from a message displayed by the second client.

In this embodiment, the terminal determines the third virtual object, and transmits the second interaction information to the third virtual object, thereby improving flexibility of information exchange, and further reducing complexity of the information exchange.

In an optional implementation,

S1: the extracting, by a terminal, a biological feature of a target object includes: acquiring, by the terminal, a facial picture of the target object by using an image acquisition device in a terminal at which the first client is located; and extracting, by the terminal, facial features of the target object from the facial picture; and S2: the recognizing, by the terminal, a current first emotion of the target object according to the extracted biological feature includes: recognizing, by the terminal, the first emotion of the target object according to the extracted facial features.

The recognizing, by the terminal, a first emotion of the target object according to the extracted facial features includes:

S1: searching, by the terminal, for an emotion identifier matching the extracted facial features; and S2: using, by the terminal, an emotion represented by the found emotion identifier as the first emotion.

Optionally, the image acquisition device may be a camera on a mobile terminal. The facial features may be features of facial organs such as eyebrows, forehead, eyes, face, and the like.

For example, descriptions are provided with reference to FIG. 3 and Table 2. The biological feature may be a facial expression or sound information of the user. As shown in FIG. 3, a facial picture of the user is acquired by using an acquisition device, the acquired facial picture is analyzed, and facial features, such as eyebrows, eyes, and mouth of the user are extracted. The first emotion of the user is correspondingly obtained according to characteristics of the facial features.

Table 2 shows an optional correspondence between the facial features and the first emotion.

TABLE 2

| Forehead and eyebrows | Eyes | A lower portion of face | First emotion |
|---|---|---|---|
| The eyebrows are raised, and become high and curved; skin under the eyebrows is stretched; and wrinkles may cross the forehead | The eyes widely open; upper eyelids are raised; lower eyelids fall; and white parts of the eyes are exposed above or below pupils | The underjaw falls; the mouth opens, the lips are separated from the teeth, but the mouth portion is not tense, and is not stretched | Surprised |

The image acquisition device being a camera is merely an optional example, and does not constitute a limitation on this application.

Optionally, after the terminal obtains a facial picture by using the camera, a facial image is cut down from the facial picture according to a face detection algorithm. According to different methods for facial feature extraction and expression classification, proportions of cut face graphs are also different. If the facial picture is a dynamic picture, facial features need to be tracked. Set processing or gray processing is performed on the cut facial picture, then the facial features are extracted, and an expression is recognized.

In this embodiment, the terminal extracts the facial features according to the facial picture of the target object, and obtains the first emotion according to the facial features, so as to directly obtain the first emotion of the target object according to the facial features, thereby reducing complexity of information exchange.

In an optional implementation,

S1: the extracting, by a terminal, a biological feature of a target object includes: acquiring, by the terminal, a sound signal of the target object by using a sound acquisition device in a terminal at which the first client is located; and extracting, by the terminal, a sound feature of the target object from the sound signal; and S2: the recognizing, by the terminal, a current first emotion of the target object according to the extracted biological feature includes: recognizing, by the terminal, the first emotion of the target object according to the extracted sound feature.

The recognizing, by the terminal, the first emotion of the target object according to the extracted sound feature includes:

S1: obtaining, by the terminal, a preconfigured target audio feature, the target audio feature being used for triggering the first interaction information;

S2: obtaining, by the terminal, an emotion identifier corresponding to the target audio feature, in a case that a similarity between the sound feature and the target audio feature is higher than a predetermined threshold; and S3: using, by the terminal, an emotion represented by the emotion identifier as the first emotion.

For example, descriptions are provided with reference to the foregoing Table 1 and FIG. 4. The sound signal may be a sound made by a user. As shown in FIG. 4, after the user makes the sound, the sound acquisition device acquires the sound of the user, and compares the acquired sound with the target audio feature, to obtain the emotion identifier corresponding to the target audio feature, and obtains the first emotion. The similarity exceeds a predetermined threshold 60%, and a corresponding emotion identifier is obtained according to the target audio feature. The emotion identifier is excitement, representing that the user currently is in great excitement.

The content in the foregoing Table 1 is merely for explanation and description, and does not constitute a limitation on this application. The target audio feature may be any sound signal acquired by the sound acquisition device. The sound feature may be acquired by using any algorithm. The target audio feature may be obtained by using a preset method. The emotion identifier may be another word.

The target audio feature may also be a feature such as timbre, tone, sound intensity, or the like of a sound. After sound information of the user is obtained, the obtained sound information is compared with the timbre, tone, and sound intensity in the target audio feature, so as to obtain the corresponding emotion identifier. Optionally, when the received sound signal is analyzed, inputted voice is recognized by using at least two voice recognition branches. Only when two voice recognition results recognized by the two voice recognition branches are consistent, recognized results can be outputted. When two voice recognition results recognized by the two voice recognition branches are inconsistent, the user is prompted to re-input a voice signal.

Optionally, when voice recognition results recognized by the at least two voice recognition branches are inconsistent, the terminal may further perform processing on the at least two voice recognition results according to the principle of subordinate of the minority to the majority or a weighting algorithm or a combination thereof, to obtain a voice recognition result, and output the voice recognition result.

Optionally, the voice recognition branches may be implemented by using hidden Markov model recognition based on statistics or a training algorithm or a combination thereof.

In this embodiment, the target audio feature is preconfigured, and in a case that a similarity between the target audio feature and the sound feature is higher than a predetermined threshold, the terminal obtains the emotion identifier corresponding to the target audio feature, and uses the emotion identified by the emotion identifier as the first emotion, so as to obtain the corresponding first emotion according to voice information, thereby reducing complexity of information exchange.

In an optional implementation, that the terminal determines the to-be-exchanged first interaction information matching the current first emotion of the target object includes:

S1: obtaining, by the terminal, an emotion identifier of the first emotion; and

S2: searching, by the terminal, for the first interaction information matching the emotion identifier of the first emotion.

Optionally, a correspondence between the emotion identifier of the first emotion and the first interaction information may be preset, and the corresponding first interaction information is searched for from the preset correspondence between the emotion identifier and the first interaction information according to the obtained emotion identifier, so as to obtain the first interaction information, and transmit the first interaction information.

In this embodiment, after the emotion identifier is obtained by using the terminal, the first interaction information is searched for according to the correspondence between the emotion identifier and the first interaction information, so that the first interaction information can be transmitted, thereby improving efficiency of information exchange.

In an optional implementation, the searching, by the terminal, for the first interaction information matching the emotion identifier of the first emotion includes:

(1) obtaining, by the terminal, in a case that the emotion identifier indicates a first emotion type, first interaction information matching the first emotion type, the first interaction information matching the first emotion type being used for asking for help for the first virtual object;

(2) obtaining, by the terminal, in a case that the emotion identifier indicates a second emotion type, first interaction information matching the second emotion type, the first interaction information matching the second emotion type being used for performing an encouraging prompt on the second virtual object; and (3) obtaining, by the terminal, in a case that the emotion identifier indicates a third emotion type, first interaction information matching the third emotion type, the first interaction information matching the third emotion type being used for making a query request to the second virtual object.

For example, descriptions continue to be provided with reference to the foregoing game. When types of obtained emotion identifiers are different, content carried by the first interaction information is different. The first emotion type may be tension, excitement, doubt, or the like. The first interaction information may be text information, such as "Save me", "Come on, we can do it!", and "Are you sure?". When the emotion identifier indicates the first emotion type, such as tension, first interaction information matching the first emotion type may be "Save me"; when the emotion identifier indicates the first emotion type, such as excitement, first interaction information matching the first emotion type may be "Come on, we can do it!"; and when the emotion identifier indicates the first emotion type, such as doubt, first interaction information matching the first emotion type may be "Are you sure?" used for representing doubt.

In this embodiment, the terminal determines content of first interaction information according to a type of the emotion identifier, so as to further reduce complexity of information exchange, and improve flexibility of the information exchange.

In an optional implementation, that the terminal determines the to-be-exchanged first interaction information matching the current first emotion of the target object includes at least one of the following:

(1) determining, by the terminal, text information matching the first emotion;

(2) determining, by the terminal, image information matching the first emotion; and (3) determining, by the terminal, audio information matching the first emotion.

Figure 12:
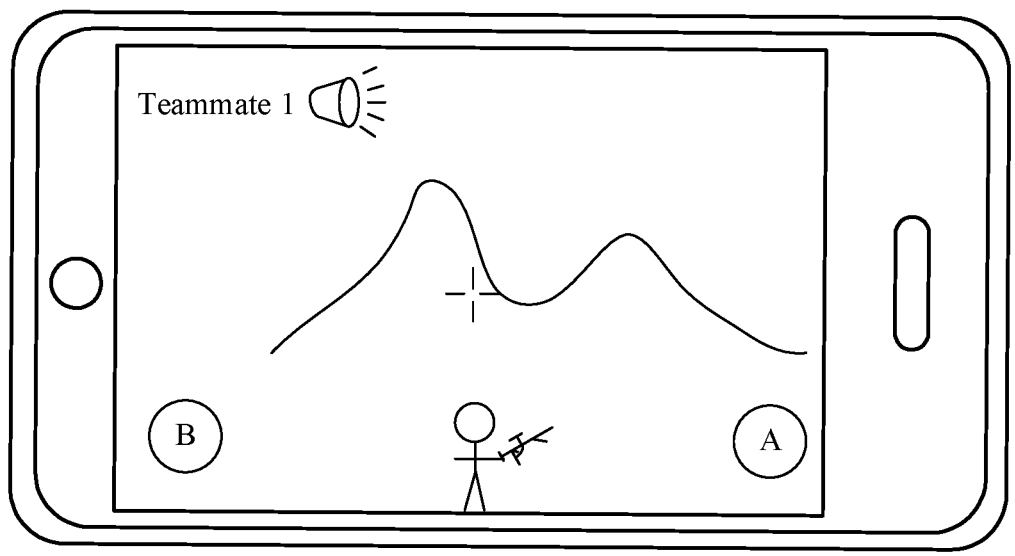
FIG. 12 is a schematic diagram of still another optional information exchange method according to an embodiment of this application.
Figure 13:
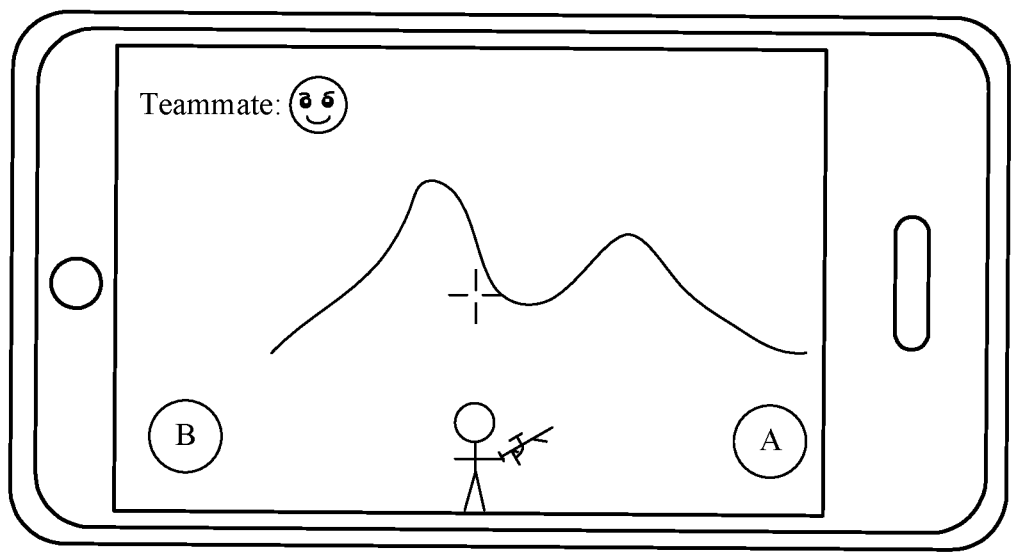
FIG. 13 is a schematic diagram of still another optional information exchange method according to an embodiment of this application.

For example, descriptions are provided by still using the foregoing game as an example with reference to FIG. 12 and FIG. 13. FIG. 12 and FIG. 13 are the second client. A message transmitted to the second client by the first client may be a voice message or an image message. As shown in FIG. 12, the message is a voice message, and as shown in FIG. 13, the message is an image message.

FIG. 12 and FIG. 13 are merely examples, and do not constitute a limitation on this application.

In this embodiment, the terminal sets different types for the first interaction information, thereby improving flexibility of information exchange, and further reducing complexity of the information exchange.

For brief description, the foregoing method embodiments are represented as a series of action combinations. However, a person skilled in the art shall appreciate that this application is not limited to the described order of the actions, because according to this application, some steps may be performed in other orders or simultaneously. Secondarily, a person skilled in the art shall also learn that the embodiments described in the specification all belong to optional embodiments and the related actions and modules are not necessary for this application.

According to the foregoing descriptions of implementations, a person skilled in the art may clearly learn that the method according to the foregoing embodiments may be implemented by using software and a necessary general hardware platform, or certainly may be implemented by using hardware. However, in most cases, the former is a better implementation. Based on such an understanding, the technical solutions in this application essentially or the part contributing to the related art may be implemented in the form of a software product. The computer software product is stored in a storage medium (such as a read-only memory (ROM)/random access memory (RAM), a magnetic disk, or an optical disc), and includes several instructions for instructing a terminal device (which may be a mobile phone, a computer, a server, a network device, and the like) to perform the method described in the embodiments of this application.

Figure 14:
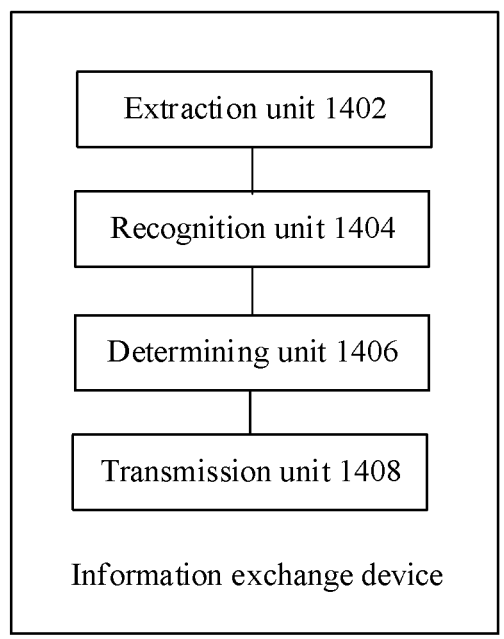
FIG. 14 is a schematic structural diagram of an optional information exchange device according to an embodiment of this application.

According to another aspect of the embodiments of this application, an information exchange device configured to perform the information exchange method is further provided. The information exchange device is applied to a terminal. In this embodiment, in an optional implementation, as shown in FIG. 14, the information exchange device may include:

(1) an extraction unit 1402, configured to extract a biological feature of a target object, the target object controlling, by using a first client, a first virtual object to execute a virtual task;

(2) a recognition unit 1404, configured to recognize a current first emotion of the target object according to the extracted biological feature;

(3) a determining unit 1406, configured to determine to-be-exchanged first interaction information matching the first emotion; and (4) a transmission unit 1408, configured to transmit the first interaction information to a second client at which a second virtual object is located, the second virtual object and the first virtual object jointly executing the virtual task.

Optionally, the information exchange device may be applied to, but not limited to, a game field or a simulation training field. The game field is used as an example. The first client may be a game device used by a user, and the second client may be a game device used by another user. The first virtual object may be a virtual object controlled by the first client, and the second virtual object may be a virtual object controlled by the second client. After a game device used by a user extracts a biological feature of the user, the game device recognizes a current first emotion, such as anger, tension, or excitement of the user according to the extracted biological feature. After recognizing the current first emotion, first interaction information matching the current first emotion is determined, and the first interaction information is transmitted to a second client used by another user.

In the foregoing method, a biological feature of a target object is extracted, a current first emotion of the target object is recognized according to the extracted biological feature, to-be-exchanged first interaction information matching the first emotion is determined, and the first interaction information is transmitted to a second client at which a second virtual object is located, so that the to-be-exchanged first interaction information can be obtained according to the biological feature of the target object, and the first interaction information can be transmitted to the second client, thereby avoiding the problem that information exchange with the target object can only be completed when an application task executed by a control object controlled by an application client is interrupted. Therefore, information exchange can be completed during a process in which the control object executes an application character, thereby implementing the technical effect of reducing complexity of an exchange operation, and resolving the problem of high complexity of an exchange operation in the related art.

Optionally, the first interaction information may be, but not limited to, one or more of text information, image information, and audio information.

Optionally, a facial picture of the target object may be acquired by using an image acquisition device of a terminal at which the first client is located, and facial features of the target object are extracted from the facial picture. An emotion identifier corresponding to the facial features is searched for according to the extracted facial features, and an emotion represented by the emotion identifier is used as the first emotion.

For example, descriptions are provided with reference to FIG. 3. The biological feature may be a facial expression or sound information of the user. As shown in FIG. 3, a facial picture of the user is acquired by using an acquisition device, the acquired facial picture is analyzed, and facial features, such as eyebrows, eyes, and mouth of the user are extracted. The first emotion of the user is correspondingly obtained according to characteristics of the facial features.

Optionally, a sound signal of the target object may be acquired by using a sound acquisition device of the terminal at which the first client is located, and a sound feature of the target object is extracted from the sound signal. The extracted sound feature is compared with a preconfigured target audio feature. In a case that a similarity between the sound feature and the target audio feature is higher than a predetermined threshold, an emotion identifier corresponding to the target audio feature is obtained, and an emotion represented by the emotion identifier is used as the first emotion.

For example, descriptions are provided with reference to the foregoing Table 1 and FIG. 4. The sound signal may be a sound made by a user. As shown in FIG. 4, after the user makes the sound, the sound acquisition device acquires the sound of the user, and compares the acquired sound with the target audio feature, to obtain the emotion identifier corresponding to the target audio feature, and obtains the first emotion. As shown in Table 1, after information of a sound signal that is of the target object and acquired by the sound acquisition device, for example, "Brothers, go!" is received, a sound feature "go" in the received sound signal is compared with the target audio feature, to obtain that a similarity between the sound feature and the target audio feature is 80%. The similarity exceeds a predetermined threshold 60%, and a corresponding emotion identifier is obtained according to the target audio feature. The emotion identifier is excitement, representing that the user currently is in great excitement.

The content in the foregoing Table 1 is merely for explanation and description, and does not constitute a limitation on this application. The target audio feature may be any sound signal acquired by the sound acquisition device. The sound feature may be acquired by using any algorithm. The target audio feature may be obtained by using a preset method. The emotion identifier may be another word.

The target audio feature may also be a feature such as timbre, tone, sound intensity, or the like of a sound. After sound information of the user is obtained, the obtained sound information is compared with the timbre, tone, and sound intensity in the target audio feature, so as to obtain the corresponding emotion identifier.

Descriptions are provided below using games are as an example with reference to FIG. 5 and FIG. 6. In a round of game, a terminal at which a first client is located acquires a facial picture and sound information of a user by using an acquisition device carried by the terminal. The acquired facial picture is analyzed to obtain facial features, and the sound information is analyzed to obtain a sound feature. A corresponding emotion identifier is obtained according to the facial features and the sound feature, so as to obtain a first emotion of the user. Subsequently, first interaction information is correspondingly obtained according to the obtained first emotion, and is displayed on a second client. A display result is shown in FIG. 5.

When the second client displays the first interaction information, the first interaction information may be or may not be displayed on the first client. FIG. 6 is an example in which the first client displays the first interaction information.

Optionally, it may be, but not limited to, determining a virtual object from the same camp as the first virtual object as a second virtual object, and determining a virtual object from a camp different from the camp that the first virtual object is from as a third virtual object.

Optionally, the second virtual object may be one or more virtual objects belonging to the same camp as the first virtual object, and the third virtual object may be one or more virtual objects belonging to camps different from the camp to which the first virtual object belongs. The second virtual object and the first virtual object may be teammates. The third virtual object and the first virtual object may be in different squads, and the like.

Optionally, the following method may be used for determining the second virtual object or the third virtual object:

(1) grouping virtual objects into the second virtual object or the third virtual object according to identity information of the virtual objects;

(2) grouping virtual objects into the second virtual object or the third virtual object according to task objectives of the virtual objects; or (3) grouping virtual objects into the second virtual object or the third virtual object according to locations of the virtual objects.

For example, the game field continues to be used as an example for description. The identity information may be genders, nationalities, and the like of the virtual objects. For example, a virtual object having the same nationality as that of the first virtual object is set as the second virtual object, and a virtual object having a nationality different from that of the first virtual object is set as the third virtual object. The locations may be birth locations of the virtual objects. For example, the birth locations are used as an example. Different birth regions of virtual objects are preset, a virtual object having the same birth region as that of the first virtual object is set as the second virtual object, and a virtual object having a birth region different from that of the first virtual object is set as the third virtual object. The task objectives of the virtual objects may be winning conditions for the virtual objects. A virtual object having the same winning condition as that of the first virtual object is grouped into the second virtual object, and a virtual object having a winning condition different from that of the first virtual object is grouped into the third virtual object.

Optionally, all virtual objects belonging to the same camp as the first virtual object may be used as the second virtual object, and the first interaction information is transmitted to the second client at which the second virtual object is located, or some virtual objects belonging to the same camp as the first virtual object are used as the second virtual object, and the second virtual object is transmitted to the second client at which the second virtual object is located; and second interaction information is transmitted to a third client at which the third virtual object is located, the third client belonging to a camp different from the camp to which the first virtual object belongs. The first interaction information matches the first emotion, the second interaction information matches a second emotion, and the first emotion is different from the second emotion.

For example, descriptions are provided by still using the foregoing game as an example with reference to FIG. 7. As shown in FIG. 7, a transmission range of the first interaction information may be configured on the first client, and the first interaction information may be an all-member message or a friend message. The first client may transmit an all-member message, and may also transmit a friend message to a configured fixed friend. Transmitting the all-member message may be transmitting a message to all other users, and transmitting the friend message may be that: a plurality of friends form a small group, and during transmission of a friend message, the friend message is transmitted to friends in one small group all at once, or the friend message is transmitted to a fixed friend.

For example, as shown in FIG. 8 to FIG. 10, FIG. 8 depicts that when the first client is configured to transmit an all-member message, the second client displays the all-member message transmitted by the first client, the all-member message being a message that can be seen by all the users. FIG. 9 depicts that when the user transmits a friend message, the friend message transmitted by the user can be seen from the second client, but the friend message cannot be seen by all the users. Only friends configured by the first client can see the friend message. An all-member message and a friend message may be distinguished by setting the all-member message and the friend message to different colors or to have different signs. As shown in FIG. 10, a friend message in FIG. 10 has an underline, and therefore is separated from the all-member message.

Optionally, after the first client transmits a message, the third client at which the third virtual object is located receives a message different from that received by the second client. For example, as shown in FIG. 5 and FIG. 11, FIG. 5 is the first interaction information received by the second client, and FIG. 11 is the first interaction information received by the third client. It can be seen that because the third virtual object of the third client and the first virtual object of the first client are from different camps, a message displayed by the third client is different from a message displayed by the second client.

Optionally, the searching for the first interaction information matching the emotion identifier of the first emotion includes: obtaining, in a case that the emotion identifier indicates a first emotion type, first interaction information matching the first emotion type, the first interaction information matching the first emotion type being used for asking for help for the first virtual object; obtaining, in a case that the emotion identifier indicates a second emotion type, first interaction information matching the second emotion type, the first interaction information matching the second emotion type being used for performing an encouraging prompt on the second virtual object; and obtaining, in a case that the emotion identifier indicates a third emotion type, first interaction information matching the third emotion type, the first interaction information matching the third emotion type being used for making a query request to the second virtual object.

In this embodiment, by using a method in which a biological feature of a target object is extracted, a current first emotion of the target object is recognized according to the extracted biological feature, to-be-exchanged first interaction information matching the first emotion is determined, and the first interaction information is transmitted to a second client at which a second virtual object is located, the to-be-exchanged first interaction information can be obtained according to the biological feature of the target object, and the first interaction information can be transmitted to the second client, thereby avoiding the problem that information exchange with the target object can only be completed when an application task executed by a control object controlled by an application client is interrupted. Therefore, the technical effect of reducing complexity of an exchange operation is implemented, and the technical problem of high complexity of an exchange operation in the related art is resolved.

In an optional implementation, the transmission unit includes:

(1) a first determining module, configured to determine the second virtual object from the virtual task, the second virtual object and the first virtual object being virtual objects from the same camp; and (2) a first transmission module, configured to transmit the first interaction information to the second client at which the second virtual object is located.

Optionally, the first interaction information may be text information, image information, or audio information. Descriptions are provided by using text information as the first interaction information with reference to FIG. 5. A client displayed in FIG. 5 is the second client, and a virtual object in the second client is the second virtual object. The first virtual object on the first client and the second virtual object are teammates, and an upper left corner of the second client displays a message transmitted by the first client. The second client can learn a state of the first virtual object of the first client.

In this embodiment, a virtual object from the same camp as a first virtual object is determined as a second virtual object, and first interaction information is transmitted to a second client at which the second virtual object is located, so as to transmit the first interaction information only to the second virtual object in the same camp, thereby improving transmission flexibility of the first interaction information.

In an optional implementation, the first determining module includes:

(1) a first obtaining submodule, configured to obtain all of virtual objects from the same camp as the second virtual objects; or (2) a second obtaining submodule, configured to obtain some of virtual objects from the same camp as the second virtual objects, the some virtual objects having an association with the first virtual object.

For example, the game field continues to be used for explanation and description. As shown in FIG. 7, FIG. 7 is a configuration interface of the first client. The first client may transmit an all-member message, and may also transmit a friend message to a configured fixed friend. Transmitting the all-member message may be transmitting a message to all other users, and transmitting the friend message may be that: a plurality of friends form a small group, and during transmission of a friend message, the friend message is transmitted to friends in one small group all at once, or the friend message is transmitted to a fixed friend.

In this embodiment, all of virtual roles belonging to the same camp as a first virtual role are used as second virtual roles, or some of virtual roles belonging to the same camp as the first virtual role are used as second virtual roles, so that the second virtual roles can be flexibly determined, thereby enabling information exchange to be more flexible.

In an optional implementation, the transmission unit further includes:

(1) a second determining module, configured to determine a third virtual object from the virtual task, the third virtual object and the first virtual object being virtual objects from different camps; and (2) a second transmission module, configured to transmit second interaction information to a third client at which the third virtual object is located, the second interaction information matching a second emotion, and the second emotion and the first emotion being different emotions.

For example, as shown in FIG. 5 and FIG. 11, FIG. 5 is the first interaction information received by the second client, and FIG. 11 is the first interaction information received by the third client. It can be seen that because the third virtual object of the third client and the first virtual object of the first client are from different camps, a message displayed by the third client is different from a message displayed by the second client.

In this embodiment, the third virtual object is determined, and the second interaction information is transmitted to the third virtual object, thereby improving flexibility of information exchange, and further reducing complexity of the information exchange. For example, as shown in FIG. 5 and FIG. 11, FIG. 5 is the first interaction information received by the second client, and FIG. 11 is the first interaction information received by the third client. It can be seen that because the third virtual object of the third client and the first virtual object of the first client are from different camps, a message displayed by the third client is different from a message displayed by the second client.

In this embodiment, the third virtual object is determined, and the second interaction information is transmitted to the third virtual object, thereby improving flexibility of information exchange, and further reducing complexity of the information exchange.

In an optional implementation, (1) the extraction unit includes: a first acquisition module, configured to acquire a facial picture of the target object by using an image acquisition device in a terminal at which the first client is located; and a first extraction module, configured to extract facial features of the target object from the facial picture; and (2) the recognition unit includes: a recognition module, configured to recognize the first emotion of the target object according to the extracted facial features.

The recognition module includes:

(1) a first search submodule, configured to search for an emotion identifier matching the extracted facial features; and (2) a first determining submodule, configured to use an emotion represented by the found emotion identifier as the first emotion.

Optionally, the image acquisition device may be a camera on a mobile terminal. The facial features may be features of facial organs such as eyebrows, forehead, eyes, face, and the like.

For example, descriptions are provided with reference to FIG. 3 and the foregoing Table 2. The biological feature may be a facial expression or sound information of the user. As shown in FIG. 3, a facial picture of the user is acquired by using an acquisition device, the acquired facial picture is analyzed, and facial features, such as eyebrows, eyes, and mouth of the user are extracted. The first emotion of the user is correspondingly obtained according to characteristics of the facial features.

The image acquisition device being a camera is merely an optional example, and does not constitute a limitation on this application.

Optionally, after a facial picture is obtained by using the camera, a facial image is cut down from the facial picture according to a face detection algorithm. According to different methods for facial feature extraction and expression classification, proportions of cut face graphs are also different. If the facial picture is a dynamic picture, facial features need to be tracked. Set processing or gray processing is performed on the cut facial picture, then the facial features are extracted, and an expression is recognized.

In this embodiment, the facial features are extracted according to the facial picture of the target object, and the first emotion is obtained according to the facial features, so as to directly obtain the first emotion of the target object according to the facial features, thereby reducing complexity of information exchange. Optionally, the image acquisition device may be a camera on a mobile terminal. The facial features may be features of facial organs such as eyebrows, forehead, eyes, face, and the like.

In an optional implementation, (1) the extraction unit includes: a second acquisition module, configured to acquire a sound signal of the target object by using a sound acquisition device in a terminal at which the first client is located; and a second extraction module, configured to extract a sound feature of the target object from the sound signal; and (2) the recognition unit includes: a second recognition module, configured to recognize the first emotion of the target object according to the extracted sound feature.

The second recognition module includes:

(1) a third obtaining submodule, configured to obtain a preconfigured target audio feature, the target audio feature being used for triggering the first interaction information;

(2) a fourth obtaining submodule, configured to obtain an emotion identifier corresponding to the target audio feature, in a case that a similarity between the sound feature and the target audio feature is higher than a predetermined threshold; and (3) a second determining submodule, configured to use an emotion represented by the emotion identifier as the first emotion.

For example, descriptions are provided with reference to the foregoing Table 1 and FIG. 4. The sound signal may be a sound made by a user. As shown in FIG. 4, after the user makes the sound, the sound acquisition device acquires the sound of the user, and compares the acquired sound with the target audio feature, to obtain the emotion identifier corresponding to the target audio feature, and obtains the first emotion. As shown in Table 1, after information of a sound signal that is of the target object and acquired by the sound acquisition device, for example, "Brothers, go!" is received, a sound feature "go" in the received sound signal is compared with the target audio feature, to obtain that a similarity between the sound feature and the target audio feature is 80%. The similarity exceeds a predetermined threshold 60%, and a corresponding emotion identifier is obtained according to the target audio feature. The emotion identifier is excitement, representing that the user currently is in great excitement.

The content in the foregoing Table 1 is merely for explanation and description, and does not constitute a limitation on this application. The target audio feature may be any sound signal acquired by the sound acquisition device. The sound feature may be acquired by using any algorithm. The target audio feature may be obtained by using a preset method. The emotion identifier may be another word.

The target audio feature may also be a feature such as timbre, tone, sound intensity, or the like of a sound. After sound information of the user is obtained, the obtained sound information is compared with the timbre, tone, and sound intensity in the target audio feature, so as to obtain the corresponding emotion identifier. Optionally, when the received sound signal is analyzed, inputted voice is recognized by using at least two voice recognition branches. Only when two voice recognition results recognized by the two voice recognition branches are consistent, recognized results can be outputted. When two voice recognition results recognized by the two voice recognition branches are inconsistent, the user is prompted to re-input a voice signal.

Optionally, in a case that voice recognition results recognized by the at least two voice recognition branches are inconsistent, processing may further be performed on the at least two voice recognition results according to the principle of subordinate of the minority to the majority or a weighting algorithm or a combination thereof, to obtain a voice recognition result, and output the voice recognition result.

Optionally, the voice recognition branches may be implemented by using hidden Markov model recognition based on statistics or a training algorithm or a combination thereof.

In this embodiment, the target audio feature is preconfigured, and in a case that a similarity between the target audio feature and the sound feature is higher than a predetermined threshold, the emotion identifier corresponding to the target audio feature is obtained, and the emotion identified by the emotion identifier is used as the first emotion, so as to obtain the corresponding first emotion according to voice information, thereby reducing complexity of information exchange.

In an optional implementation, the determining unit includes:

(1) an obtaining module, configured to obtain an emotion identifier of the first emotion; and (2) a search module, configured to search for the first interaction information matching the emotion identifier of the first emotion.

Optionally, a correspondence between the emotion identifier of the first emotion and the first interaction information may be preset, and the corresponding first interaction information is searched for from the preset correspondence between the emotion identifier and the first interaction information according to the obtained emotion identifier, so as to obtain the first interaction information, and transmit the first interaction information.

In this embodiment, after the emotion identifier is obtained, the first interaction information is searched for according to the correspondence between the emotion identifier and the first interaction information, so that the first interaction information can be transmitted, thereby improving efficiency of information exchange.

In an optional implementation, the search module includes:

(1) a fifth obtaining submodule, configured to obtain, in a case that the emotion identifier indicates a first emotion type, first interaction information matching the first emotion type, the first interaction information matching the first emotion type being used for asking for help for the first virtual object;

(2) a sixth obtaining submodule, configured to obtain, in a case that the emotion identifier indicates a second emotion type, first interaction information matching the second emotion type, the first interaction information matching the second emotion type being used for performing an encouraging prompt on the second virtual object; and (3) a seventh obtaining submodule, configured to obtain, in a case that the emotion identifier indicates a third emotion type, first interaction information matching the third emotion type, the first interaction information matching the third emotion type being used for making a query request to the second virtual object.

For example, descriptions continue to be provided with reference to the foregoing game. When types of obtained emotion identifiers are different, content carried by the first interaction information is different. The first emotion type may be tension, excitement, doubt, or the like.

In this embodiment, content of first interaction information is determined according to a type of the emotion identifier, so as to further reduce complexity of information exchange, and improve flexibility of the information exchange.

In an optional implementation, the determining unit includes at least one of the following:

(1) a third determining module, configured to determine text information matching the first emotion;

(2) a fourth determining module, configured to determine image information matching the first emotion; and (3) a fifth determining module, configured to determine audio information matching the first emotion.

For example, descriptions are provided by still using the foregoing game as an example with reference to FIG. 12 and FIG. 13. FIG. 12 and FIG. 13 are the second client. A message transmitted to the second client by the first client may be a voice message or an image message. As shown in FIG. 12, the message is a voice message, and as shown in FIG. 13, the message is an image message.

FIG. 12 and FIG. 13 are merely examples, and do not constitute a limitation on this application.

In this embodiment, different types are set for the first interaction information, thereby improving flexibility of information exchange, and further reducing complexity of the information exchange.

An embodiment of this application further provides a storage medium, storing a computer program, the computer program being configured to perform steps in any one of the foregoing method embodiments when run.

Optionally, in this embodiment, the storage medium may be configured to store a computer program used for performing the following steps:

S1: extracting a biological feature of a target object, the target object controlling, by using a first client, a first virtual object to execute a virtual task;

S2: recognizing a current first emotion of the target object according to the extracted biological feature;

S3: determining to-be-exchanged first interaction information matching the first emotion; and S4: transmitting the first interaction information to a second client at which a second virtual object is located, the second virtual object and the first virtual object jointly executing the virtual task.

Optionally, in this embodiment, the storage medium may be configured to store a computer program used for performing the following steps:

S1: determining the second virtual object from the virtual task, the second virtual object and the first virtual object being virtual objects from the same camp; and S2: transmitting the first interaction information to the second client at which the second virtual object is located.

Optionally, in this embodiment, the storage medium may be configured to store a computer program used for performing the following steps:

S1: obtaining all of virtual objects from the same camp as the second virtual objects; or S2: obtaining some of virtual objects from the same camp as the second virtual objects, the some virtual objects having an association with the first virtual object.

Optionally, in this embodiment, the storage medium may be configured to store a computer program used for performing the following steps:

S1: determining a third virtual object from the virtual task, the third virtual object and the first virtual object being virtual objects from different camps; and S2: transmitting second interaction information to a third client at which the third virtual object is located, the second interaction information matching a second emotion, and the second emotion and the first emotion being different emotions.

Optionally, in this embodiment, the storage medium may be configured to store a computer program used for performing the following steps:

S1: the extracting a biological feature of a target object includes: acquiring a facial picture of the target object by using an image acquisition device in a terminal at which the first client is located; and extracting facial features of the target object from the facial picture; and S2: recognizing a first emotion of the target object according to the extracted facial features.

Optionally, in this embodiment, the storage medium may be configured to store a computer program used for performing the following steps:

S1: searching for an emotion identifier matching the extracted facial features; and S2: using an emotion represented by the found emotion identifier as the first emotion.

Optionally, in this embodiment, the storage medium may be configured to store a computer program used for performing the following steps:

S1: acquiring a sound signal of the target object by using a sound acquisition device in a terminal at which the first client is located; and extracting a sound feature of the target object from the sound signal; and S2: recognizing a first emotion of the target object according to the extracted sound feature.

Optionally, in this embodiment, the storage medium may be configured to store a computer program used for performing the following steps:

S1: obtaining a preconfigured target audio feature, the target audio feature being used for triggering the first interaction information;

S2: obtaining an emotion identifier corresponding to the target audio feature, in a case that a similarity between the sound feature and the target audio feature is higher than a predetermined threshold; and S3: using an emotion represented by the emotion identifier as the first emotion.

Optionally, in this embodiment, the storage medium may be configured to store a computer program used for performing the following steps:

S1: obtaining an emotion identifier of the first emotion; and

S2: searching for the first interaction information matching the emotion identifier of the first emotion.

Optionally, in this embodiment, the storage medium may be configured to store a computer program used for performing the following steps:

S1: obtaining, in a case that the emotion identifier indicates a first emotion type, first interaction information matching the first emotion type, the first interaction information matching the first emotion type being used for asking for help for the first virtual object;

S2: obtaining, in a case that the emotion identifier indicates a second emotion type, first interaction information matching the second emotion type, the first interaction information matching the second emotion type being used for performing an encouraging prompt on the second virtual object; and S3: obtaining, in a case that the emotion identifier indicates a third emotion type, first interaction information matching the third emotion type, the first interaction information matching the third emotion type being used for making a query request to the second virtual object.

Optionally, in this embodiment, the storage medium may be configured to store a computer program used for performing the following steps:

S1: determining text information matching the first emotion;

S2: determining image information matching the first emotion; and

S3: determining audio information matching the first emotion.

Optionally, the storage medium is further configured to store a computer program used for performing steps included in the method in the foregoing embodiments. This is not described again in this embodiment.

Optionally, in this embodiment, a person of ordinary skill in the art may understand that all or some of the steps of the methods in the embodiments may be implemented by a program instructing relevant hardware of the terminal device. The program may be stored in a computer-readable storage medium, and the storage medium may include a flash drive, a read-only memory (ROM), a random access memory (RAM), a magnetic disk, an optical disc, or the like.

Figure 15:
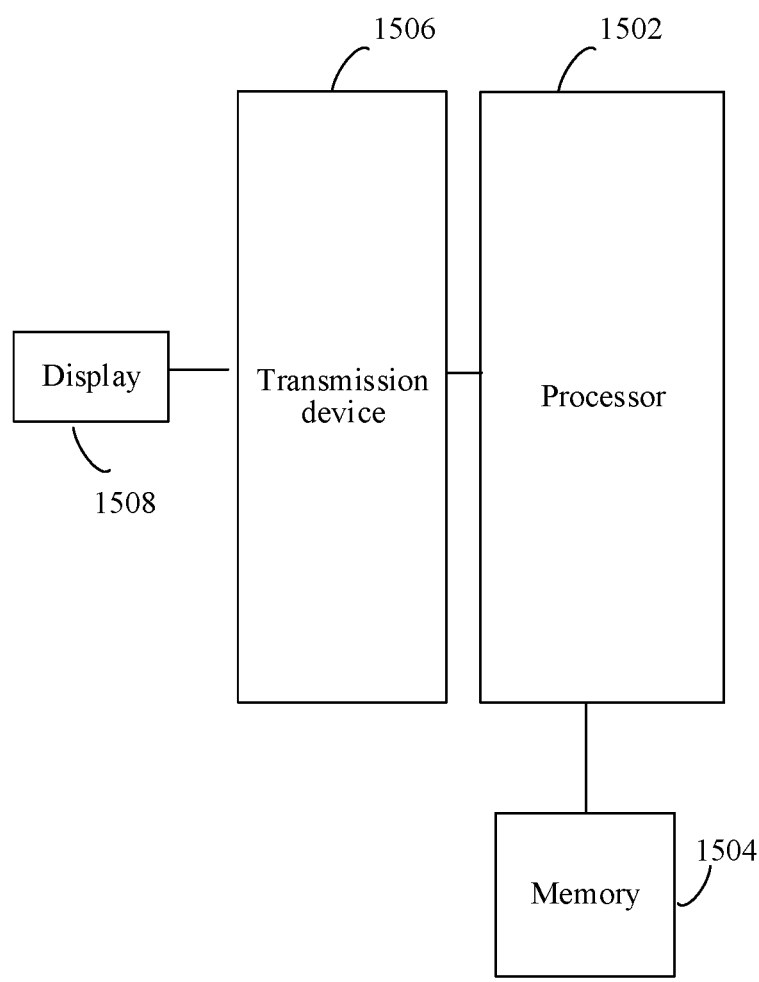
FIG. 15 is a schematic structural diagram of an optional electronic device according to an embodiment of this application.

According to still another aspect of the embodiments of this application, an electronic device configured to perform the foregoing information exchange method is further provided. As shown in FIG. 15, the electronic device includes a processor 1502, a memory 1504, a transmission device 1506, and a display 1508. The memory 1504 stores a computer program, and the processor is configured to perform steps in any one of the foregoing method embodiments through the computer program. The transmission device 1506 is configured to transmit acquired facial pictures, voice information, and the like. The display 1508 is configured to display first interaction information, and the like.

Optionally, in this embodiment, the electronic device may be located in at least one of a plurality of network devices in a computer network.

Optionally, in this embodiment, the processor 1502 may be configured to perform, through the computer program, the following steps:

S1: extracting a biological feature of a target object, the target object controlling, by using a first client, a first virtual object to execute a virtual task;

S2: recognizing a current first emotion of the target object according to the extracted biological feature;

S3: determining to-be-exchanged first interaction information matching the first emotion; and S4: transmitting the first interaction information to a second client at which a second virtual object is located, the second virtual object and the first virtual object jointly executing the virtual task.

Optionally, a person of ordinary skill in the art may understand that, the structure shown in FIG. 15 is only illustrative. The electronic device may be a terminal device such as a smartphone (for example, an Android mobile phone or an iOS mobile phone), a tablet computer, a palmtop computer, a mobile Internet device (MID), or a PAD. FIG. 15 does not constitute a limitation on a structure of the foregoing electronic device. For example, the electronic device may further include more or less components (such as a network interface, and the like) than those shown in FIG. 15, or has a configuration different from that shown in FIG. 15.

The memory 1504 may be configured to store a software program and module, such as a program instruction/module corresponding to the information exchange method in the embodiments of this application. The processor 1502 runs the software program and module stored in the memory 1504, to perform various functional applications and data processing, thereby implementing the foregoing information exchange method. The memory 1504 may include a high speed random access memory, and may further include a non-volatile memory, for example, one or more magnetic storage devices, a flash memory, or another non-volatile solid-state memory. In some embodiments, the memory 1504 may further include memories remotely disposed relative to the processor 1502, and these remote memories may be connected to the terminal by using a network. Examples of the network include but are not limited to, the Internet, an intranet, a local area network, a mobile communications network, and a combination thereof.

The transmission device 1506 is configured to receive or transmit data by using a network. Specific examples of the foregoing network may include a wired network and a wireless network. In an example, the transmission device 1506 includes a network interface controller (NIC) that may be connected to another network device and router by using a cable, to communicate with the Internet or a local area network. In an embodiment, the transmission device 1506 is a radio frequency (RF) module that is configured to communicate with the Internet in a wireless manner.

The memory 1504 is configured to store information such as the first interaction information, the extracted biological feature, and the like.

The sequence numbers of the foregoing embodiments of this application are merely for the convenience of description, and do not imply the preference among the embodiments.

When the integrated unit in the foregoing embodiment is implemented in the form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods in the embodiments of this application.

In the foregoing embodiments of this application, the descriptions of the embodiments have their respective focuses. For a part that is not described in detail in an embodiment, refer to related descriptions in other embodiments.

In the several embodiments provided in this application, it is to be understood that the disclosed client may be implemented in other manners. For example, the described device embodiment is merely for illustration purposes. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in the form of hardware, or may be implemented in the form of a software function unit.

The foregoing descriptions are merely optional implementations of this application. A person of ordinary skill in the art may make various improvements and refinements without departing from the principle of this application, and these all fall within the protection scope of this application.

INDUSTRIAL APPLICABILITY

In the embodiments of this application, by using a method in which a biological feature of a target object is extracted, a current first emotion of the target object is recognized according to the extracted biological feature, to-be-exchanged first interaction information matching the first emotion is determined, and the first interaction information is transmitted to a second client at which a second virtual object is located, the to-be-exchanged first interaction information can be obtained according to the biological feature of the target object, and the first interaction information can be transmitted to the second client, thereby avoiding the problem that information exchange with the target object can only be completed when an application task executed by a control object controlled by an application client is interrupted. Therefore, information exchange can be completed during a process in which the control object executes an application character, thereby implementing the technical effect of reducing complexity of an exchange operation.

What is claimed is:

1. An information exchange method performed at a terminal having one or more processors and memory storing programs to be executed by the one or more processors, the method comprising:

extracting, by the terminal, a biological feature of a target object, the target object controlling, by using a first client running at the terminal, a first virtual object to execute a virtual task within a game;

recognizing, by the terminal, a current first emotion of the target object according to the extracted biological feature, wherein the terminal searches in a storage of the memory for an emotion identifier associated with the current first emotion, and wherein the emotion identifier corresponds to the extracted biological feature;

generating, by the terminal, an alert matching the emotion identifier of the current first emotion, the alert comprising a text message;

transmitting, by the terminal, the alert to a second client running at a second terminal at which a second virtual object is located and controlled by a second target, wherein the alert is displayed at the second client, the second target controls the second virtual object in accordance with the alert to jointly execute the virtual task within the game with the first virtual object.

2. The method according to claim 1, wherein the transmitting, by the terminal, the alert to a second client running at a second terminal at which a second virtual object is located comprises:

determining, by the terminal, the second virtual object from the virtual task, the second virtual object and the first virtual object being virtual objects from the same camp, different from an opposing second camp in the game; and transmitting, by the terminal, the alert to the second client at which the second virtual object is located.

3. The method according to claim 2, wherein the determining, by the terminal, the second virtual object from the virtual task comprises:

obtaining, by the terminal, all of virtual objects from the same camp as the second virtual objects; or obtaining, by the terminal, some of virtual objects from the same camp as the second virtual objects, the same virtual objects having an association with the first virtual object.

4. The method according to claim 1, further comprising:
during the transmitting, by the terminal, the alert to the second client running at a second terminal at which the second virtual object is located:
determining, by the terminal, a third virtual object from the virtual task, the third virtual object and the first virtual object being virtual objects from different camps; and
transmitting, by the terminal, second interaction information to a third client at which the third virtual object is located, the second interaction information matching a second emotion, and the second emotion and the first emotion being different emotions.

5. The method according to claim 1, wherein
the extracting, by the terminal, a biological feature of a target object comprises: acquiring, by the terminal, a facial picture of the target object by using an image acquisition device in the terminal at which the first client is located; and extracting facial features of the target object from the facial picture; and
the recognizing, by the terminal, a current first emotion of the target object according to the extracted biological feature comprises: recognizing, by the terminal, the first emotion of the target object according to the extracted facial features.

6. The method according to claim 5, wherein the recognizing, by the terminal, the first emotion of the target object according to the extracted facial features comprises:
searching, by the terminal, for an emotion identifier matching the extracted facial features; and
using, by the terminal, an emotion represented by the found emotion identifier as the first emotion.

7. The method according to claim 1, wherein
the extracting, by the terminal, a biological feature of a target object comprises: acquiring, by the terminal, a sound signal of the target object by using a sound acquisition device in the terminal at which the first client is located; and extracting a sound feature of the target object from the sound signal; and
the recognizing, by the terminal, a current first emotion of the target object according to the extracted biological feature comprises: recognizing, by the terminal, the first emotion of the target object according to the extracted sound feature.

8. The method according to claim 7, wherein the recognizing, by the terminal, the first emotion of the target object according to the extracted sound feature comprises:
obtaining, by the terminal, a preconfigured target audio feature, the target audio feature being used for triggering the alert;
obtaining, by the terminal, an emotion identifier corresponding to the target audio feature, in a case that a similarity between the sound feature and the target audio feature is higher than a predetermined threshold; and
using, by the terminal, an emotion represented by the emotion identifier as the first emotion.

9. The method according to claim 1, wherein the determining, by the terminal, to-be-exchanged alert matching the current first emotion of the target object comprises:
obtaining, by the terminal, an emotion identifier of the first emotion; and
searching, by the terminal, for the first interaction information matching the emotion identifier of the first emotion.

10. The method according to claim 9, wherein the searching, by the terminal, for the alert matching the emotion identifier of the first emotion comprises:
obtaining, by the terminal, in a case that the emotion identifier indicates a first emotion type, alert matching the first emotion type, the alert matching the first emotion type being used for asking for help for the first virtual object;
obtaining, by the terminal, in a case that the emotion identifier indicates a second emotion type, alert matching the second emotion type, the alert matching the second emotion type being used for performing an encouraging prompt on the second virtual object; and
obtaining, by the terminal, in a case that the emotion identifier indicates a third emotion type, alert matching the third emotion type, the alert matching the third emotion type being used for making a query request to the second virtual object.

11. The method according to claim 1, wherein the determining, by the terminal, to-be-exchanged alert matching the current first emotion of the target object comprises at least one of the following:
determining, by the terminal, text information matching the first emotion;
determining, by the terminal, image information matching the first emotion; and
determining, by the terminal, audio information matching the first emotion.

12. A terminal, comprising one or more processors, memory coupled to the one or more processors and a plurality of programs stored in the memory that, when executed by the one or more processors, cause the terminal to perform a plurality of operations including:
extracting a biological feature of a target object, the target object controlling, by using a first client running at the terminal, a first virtual object to execute a virtual task within a game;
recognizing a current first emotion of the target object according to the extracted biological feature, wherein the terminal searches in a storage of the memory for an emotion identifier associated with the current first emotion, and wherein the emotion identifier corresponds to the extracted biological feature;
generating, by the terminal, an alert matching the emotion identifier of the current first emotion, the alert comprising a text message;
transmitting, by the terminal, the alert to a second client running at a second terminal at which a second virtual object is located and controlled by a second target, wherein the alert is displayed at the second client, the second target controls the second virtual object in accordance with the alert to jointly execute the virtual task within the game with the first virtual object.

13. The terminal according to claim 12, wherein the plurality of operations further comprise:
during the transmitting, by the terminal, the alert to the second client running at a second terminal at which the second virtual object is located:
determining, by the terminal, a third virtual object from the virtual task, the third virtual object and the first virtual object being virtual objects from different camps; and
transmitting, by the terminal, second interaction information to a third client at which the third virtual object is located, the second interaction information matching a second emotion, and the second emotion and the first emotion being different emotions.

14. The terminal according to claim 12, wherein
the extracting, by the terminal, a biological feature of a target object comprises: acquiring, by the terminal, a facial picture of the target object by using an image acquisition device in the terminal at which the first client is located; and extracting facial features of the target object from the facial picture; and
the recognizing, by the terminal, a current first emotion of the target object according to the extracted biological feature comprises: recognizing, by the terminal, the first emotion of the target object according to the extracted facial features.

15. The terminal according to claim 12, wherein
the extracting, by the terminal, a biological feature of a target object comprises: acquiring, by the terminal, a sound signal of the target object by using a sound acquisition device in the terminal at which the first client is located; and extracting a sound feature of the target object from the sound signal; and
the recognizing, by the terminal, a current first emotion of the target object according to the extracted biological feature comprises: recognizing, by the terminal, the first emotion of the target object according to the extracted sound feature.

16. The terminal according to claim 12, wherein the determining, by the terminal, to-be-exchanged alert matching the current first emotion of the target object comprises:
obtaining, by the terminal, an emotion identifier of the first emotion; and
searching, by the terminal, for the alert matching the emotion identifier of the first emotion.

17. The terminal according to claim 12, wherein the determining, by the terminal, to-be-exchanged alert matching the current first emotion of the target object comprises at least one of the following:
determining, by the terminal, text information matching the first emotion;
determining, by the terminal, image information matching the first emotion; and
determining, by the terminal, audio information matching the first emotion.

18. A non-transitory computer-readable storage medium, storing at least one instruction, at least one program, and a code set or an instruction set, the instruction, the program, and the code set or the instruction set being loaded and executed by a processor of a terminal to implement operations including:
extracting a biological feature of a target object, the target object controlling, by using a first client running at the terminal, a first virtual object to execute a virtual task within a game;
recognizing a current first emotion of the target object according to the extracted biological feature, wherein the terminal searches in a storage of the memory for an emotion identifier associated with the current first emotion, and wherein the emotion identifier corresponds to the extracted biological feature;
generating, by the terminal, an alert matching the emotion identifier of the current first emotion, the alert comprising a text message;
transmitting, by the terminal, the alert to a second client running at a second terminal at which a second virtual object is located and controlled by a second target, wherein the alert is displayed at the second client, the second target controls the second virtual object in accordance with the alert to jointly execute the virtual task within the game with the first virtual object.

19. The non-transitory computer-readable storage medium according to claim 18, wherein
the extracting, by the terminal, a biological feature of a target object comprises: acquiring, by the terminal, a facial picture of the target object by using an image acquisition device in the terminal at which the first client is located; and extracting facial features of the target object from the facial picture; and
the recognizing, by the terminal, a current first emotion of the target object according to the extracted biological feature comprises: recognizing, by the terminal, the first emotion of the target object according to the extracted facial features.

20. The non-transitory computer-readable storage medium according to claim 18, wherein
the extracting, by the terminal, a biological feature of a target object comprises: acquiring, by the terminal, a sound signal of the target object by using a sound acquisition device in the terminal at which the first client is located; and extracting a sound feature of the target object from the sound signal; and
the recognizing, by the terminal, a current first emotion of the target object according to the extracted biological feature comprises: recognizing, by the terminal, the first emotion of the target object according to the extracted sound feature.

* * * * *